(12) United States Patent
Sanderson et al.

(10) Patent No.: US 8,262,032 B2
(45) Date of Patent: Sep. 11, 2012

(54) COLLAPSIBLE WING BEAMS AND METHOD

(75) Inventors: Terry M. Sanderson, Tucson, AZ (US); David R. Sar, Corona, CA (US)

(73) Assignee: Raytheon Company, Waltham, MA (US)

(*) Notice: Subject to any disclaimer, the term of this patent is extended or adjusted under 35 U.S.C. 154(b) by 537 days.

(21) Appl. No.: 12/616,812

(22) Filed: Nov. 12, 2009

(65) Prior Publication Data

US 2010/0116937 A1    May 13, 2010

Related U.S. Application Data

(60) Provisional application No. 61/114,102, filed on Nov. 13, 2008.

(51) Int. Cl.
  *B64C 3/48* (2006.01)
  *B64C 3/44* (2006.01)
  *B64C 3/56* (2006.01)
  *B64C 3/00* (2006.01)

(52) U.S. Cl. ............ 244/219; 244/201; 244/123.5; 416/142; 416/233

(58) Field of Classification Search ............ 244/201, 244/211–217, 219, 87, 90 R, 123.1, 123.11, 244/123.5; 416/142, 143, 233
See application file for complete search history.

(56) References Cited

U.S. PATENT DOCUMENTS

| | | | |
|---|---|---|---|
| 2,125,064 A * | 7/1938 | Burgess | 244/219 |
| 2,288,750 A * | 7/1942 | Seeman | 244/219 |
| 2,487,465 A | 11/1949 | Murray, Sr. | |
| 2,550,278 A | 4/1951 | Jean | |
| 2,559,827 A | 7/1951 | Northrup | |
| 3,076,623 A * | 2/1963 | Lyon | 244/215 |
| 3,172,621 A * | 3/1965 | Erwin | 244/207 |
| 3,672,608 A | 6/1972 | Gioia et al. | |
| 4,341,176 A * | 7/1982 | Orrison | 114/102.22 |
| 4,582,278 A * | 4/1986 | Ferguson | 244/219 |
| 4,824,053 A | 4/1989 | Sarh | |

(Continued)

FOREIGN PATENT DOCUMENTS

CN    101028866 A    9/2007

(Continued)

OTHER PUBLICATIONS

Shaw, John A. et al., "The Manufacture of Niti Foams", Proceedings of 2002 ASME International Mechanical Engineering Congress and Exposition, (2002), pp. 1-10.

(Continued)

*Primary Examiner* — Joseph W Sanderson
(74) *Attorney, Agent, or Firm* — Renner, Otto, Boisselle & Sklar, LLP

(57) ABSTRACT

A wing, such as a wing for an unmanned aerial vehicle (UAV), includes a beam or box that can be selectively expanded from a collapsed condition, to increase the thickness of the wing. The beam may include a pair of plates that are close together when the beam is in a collapsed condition, and separate from one another to put the beam in an expanded condition. The plates may be substantially parallel to each other, and may have shape memory foam and/or resilient devices, such as coil springs, between them, in order to provide a force to separate the plates before, during, and/or after deployment of the wing. The expandable/collapsible beam may have a lock mechanism to lock it into place when the beam is in an expanded condition.

17 Claims, 3 Drawing Sheets

U.S. PATENT DOCUMENTS

| | | | |
|---|---|---|---|
| 5,049,591 | A | 9/1991 | Hayashi et al. |
| 5,082,207 | A | 1/1992 | Tulinius |
| 5,181,678 | A | 1/1993 | Widnall et al. |
| 5,531,407 | A * | 7/1996 | Austin et al. .................. 244/219 |
| 6,010,098 | A | 1/2000 | Campanile et al. |
| 6,045,096 | A * | 4/2000 | Rinn et al. .................... 244/219 |
| 6,098,927 | A | 8/2000 | Gevers |
| 6,264,136 | B1 | 7/2001 | Weston |
| 6,622,974 | B1 * | 9/2003 | Dockter et al. ............... 244/219 |
| 6,705,568 | B2 | 3/2004 | Lee |
| 6,834,835 | B1 | 12/2004 | Knowles et al. |
| 7,055,782 | B2 * | 6/2006 | Dittrich ......................... 244/219 |
| 7,669,799 | B2 * | 3/2010 | Elzey et al. ............... 244/123.12 |
| 7,777,165 | B2 | 8/2010 | Sanderson et al. |
| 7,931,240 | B2 * | 4/2011 | Kothera et al. ............... 244/218 |
| 2002/0195177 | A1 | 12/2002 | Hinkley et al. |
| 2004/0086699 | A1 * | 5/2004 | Schneider .................. 428/292.1 |
| 2007/0107189 | A1 | 5/2007 | Prichard et al. |
| 2008/0035788 | A1 * | 2/2008 | Kothera et al. ............... 244/99.8 |
| 2009/0072094 | A1 | 3/2009 | Sanderson et al. |
| 2009/0166477 | A1 | 7/2009 | Bousfield |
| 2009/0206192 | A1 | 8/2009 | Sanderson et al. |
| 2009/0283643 | A1 | 11/2009 | Sar et al. |
| 2009/0283936 | A1 | 11/2009 | Sanderson et al. |
| 2009/0286101 | A1 | 11/2009 | Sar et al. |

FOREIGN PATENT DOCUMENTS

| | | |
|---|---|---|
| EP | 1607602 A2 | 12/2005 |
| GB | 2445099 A | 6/2008 |
| WO | 03068584 A1 | 8/2003 |
| WO | 2007001392 A2 | 1/2007 |

OTHER PUBLICATIONS

Perkins, David A. et al., "Morphing Wing Structures for Loitering Air Vehicles", 45th AIAA/ASME/ASCE/AHS/ASC Structures, Structural Dynamics & Materials Conference, (2004), p. 1.

Application from related U.S. Appl. No. 12/277,345, filed Nov. 25, 2008.

* cited by examiner

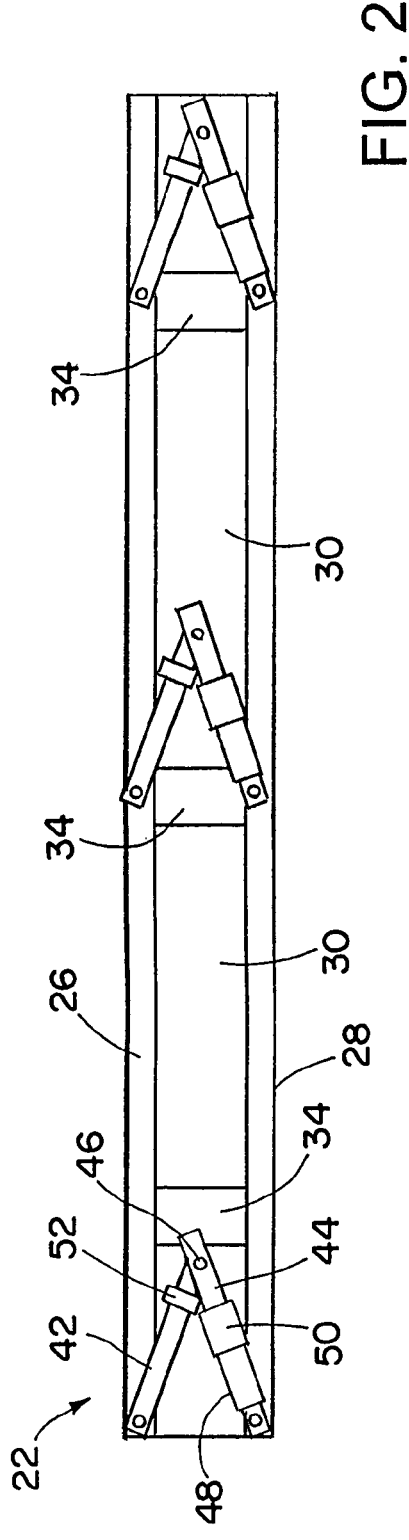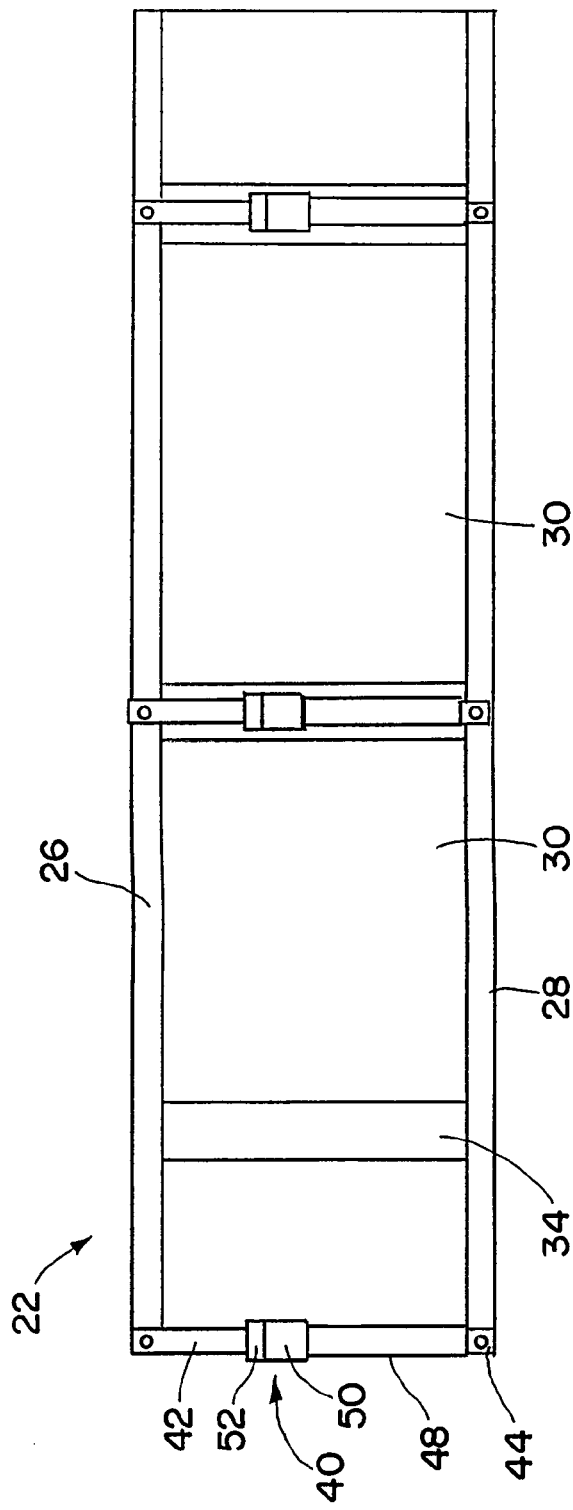

COLLAPSIBLE WING BEAMS AND METHOD

This application claims priority under 35 USC 119 from U.S. Provisional Application No. 61/114,102, filed Nov. 13, 2008, which is incorporated herein by reference in its entirety.

BACKGROUND OF THE INVENTION

1. Field of the Invention

The invention is in the field of wings and wing structures, as well as more generally in the field of deployable structures.

2. Description of the Related Art

There is a need to stow small aerial vehicles, such as unmanned aerial vehicles (UAVs), in small places, such as in tubes or other launchers.

SUMMARY OF THE INVENTION

Described herein are variable height beam structures that make telescoping structures, such as for use in wings and deployable space structures, compact for stowage or other reasons. The variable height beam structures are simple and have low cost, and may provide collapsible height wing box structures.

According to an aspect of the invention, a wing has an embedded variable height beam structure.

According to another aspect of the invention, a variable height beam structure or box has foam material between a pair of plates. The foam material may be shape memory polymer foam, and may have springs, such as coil springs, embedded in it. Structural members, such as shafts or plates, may be used to support the box in its extended configuration. Locks may be used to maintain the structural members in the extended configuration, once that configuration is achieved.

According to yet another aspect of the invention, an air vehicle wing includes: a wing skin; and a collapsible beam enclosed by the wing skin, wherein the collapsible beam can be selective expanded or collapsed to change thickness of the wing.

According to still another aspect of the invention, a method of increasing thickness of a wing includes the steps of: expanding a collapsible beam within the wing; and locking the collapsible beam in place in an expanded configuration, wherein the locking includes locking using a lock mechanism of the beam.

According to a further aspect of the invention, a structure comprising: a solid polymer material skin; and a collapsible beam enclosed by the skin, wherein the collapsible beam can be selective expanded or collapsed to change thickness of the structure. The collapsible beam includes: a pair of plates that are substantially parallel to each other; a foam between the plates; and one or more coil springs between the plates. The beam is expanded by moving the plates away from each other, and the beam is collapsed by moving the plates toward each other.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 2 is a side view of one embodiment of an expandable beam, in a collapsed or low-height configuration, usable in the wing of FIG. 1.

FIG. 3 is a side view of the expandable beam of FIG. 2, in an expanded or high-height configuration.

DETAILED DESCRIPTION

A wing, such as a wing for an unmanned aerial vehicle (UAV), includes a beam or box that can be selectively expanded from a collapsed condition, to increase the thickness of the wing. The beam may include a pair of plates that are close together when the beam is in a collapsed condition, and separate from one another to put the beam in an expanded condition. The plates may be substantially parallel to each other, and may have shape memory foam and/or resilient devices, such as coil springs, between them, in order to provide a force to separate the plates before, during, and/or after deployment of the wing. The expandable/collapsible beam may have a lock mechanism to lock it into place when the beam is in an expanded condition.

Figure 1:
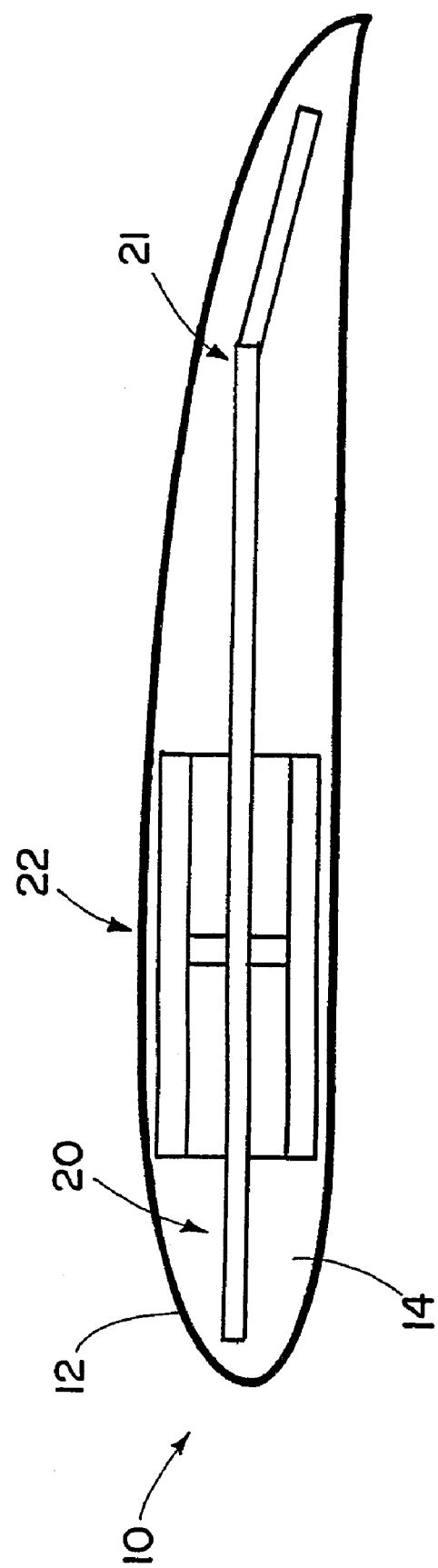
FIG. 1 is a cross-sectional view of a wing in accordance with an embodiment of the present invention.

FIG. 1 shows a cross-section of a wing 10 in accordance with an embodiment of the invention. The wing 10 has an elastomeric or shape memory polymer (SMP) shell or skin 12, surrounding and covering a shape memory polymer foam (SMF) material 14 in the interior of the wing 10. The SMP shell or skin 12 may a solid material, defined herein as a material that is substantially without voids. The SMF material 14 may be made of a similar material, but with voids therein. The SMP and SMF may constitute a material that may be able to undergo a large strain, such an extension of 400%, without rupturing or undergoing irreversible (plastic) deformations. The following pending applications, the descriptions and figures of which are incorporated herein by reference, describe examples of use of such foams (and other materials), with and without underlying structures: U.S. application Ser. No. 11/670,736, filed Feb. 2, 2007; U.S. application Ser. No. 12/120,271, filed May 14, 2008; U.S. application Ser. No. 12/120,273, filed May 14, 2008; U.S. application Ser. No. 12/120,275, filed May 14, 2008; and U.S. application Ser. No. 12/181,490, filed Jul. 29, 2008.

The interior of the wing 10 may have structural members, such as a reinforcing plate 20, and a deployable (expandable) or collapsible wing box or beam 22. The reinforcing plate 20 may be made of sheet metal, such as suitable steel, aluminum, or titanium (for example), and may have a bend 21 to better follow the cross-section shape of the wing 10. Other suitable materials for the plate 20 include any of a variety of suitable plastics, or any of a variety of suitable polymer matrix composites. The reinforcing plate 20 may be generally oriented along the chord of the wing. The reinforcing plate 20 provides structural support to maintain the general shape of the wing 10. The wing box 22 may be attached to the reinforcing plate 20, and/or may surround all or part of the reinforcing plate 20, for example being on the top and bottom of the reinforcing plate 20. The wing box 22 may be a collapsible and/or roll up wing box.

The wing box 22 may be in a compressed or compact configuration, for use in a compact configuration of the wing, aircraft, space structure, or other structure or device, for example in a compact configuration of an unmanned aerial vehicle (UAV) in a launcher, prior to launch. The wing box 22 may then be deployed to expand the thickness or other dimension of the wing. This causes an increase in the thickness of the wing 10. This may be done after launch of the UAV or other structure that includes the wing 10. The foam material 14 around box 22 may change shape to accommodate the expanded box.

The collapsible box or beam 22 may have a depth such that it runs along a substantial portion of the span of the wing 10. The wing 10 may be able to extend or retract in the direction of the depth of the collapsible box or beam 22, increasing or decreasing the span of the wing 10. Such changes in span are described in at least some of the above-incorporated applications. Changes in span may be accomplished by any of a variety of suitable mechanisms, for instance using telescoping members and/or coil springs to provide force to extend the wingspan. The collapsible box or beam 22 may also extend in the direction of its depth.

FIGS. 2 and 3 show side views of collapsed and extended configurations of wing box or other expandable structure 22. The box 22 has a pair of plates 26 and 28 that are close to each other in the collapsed configuration shown in FIG. 2. The plates 26 and 28 are further separated from each other in the extended or expanded configuration shown in FIG. 3. The plates 26 and 28 may be substantially parallel in FIG. 3, separating a substantially constant distance along their depth. Alternatively the plates 26 and 28 may vary in their distance from one another, perhaps being angled toward or away from each other along their depth.

A shape memory polymer foam 30 may fill some or all of the space between the plates 26 and 28. More broadly, the SMF material 30 may be between the plates 26 and 28. The SMF material 30 may hold the box 22 in its initial collapsed configuration. When expansion of the box 22 is desired, the SMF material 30 may be released to allow it to expand. Alternatively the SMF material 30 heated or otherwise treated to allow it to extend, for example activating the shape memory properties of the SMF material 30. This causes the SMF material to expand to its expanded configuration, shown in FIG. 3.

Other structural features of the box aid in expanding the box from the collapsed configuration to the expanded configuration. Sets of coil springs 34 may be embedded in the SMF material 30 to provide additional force to expand the SMF material 30 after the SMF material 30 is released.

The box 22 may also include locks 40 to maintain the box 22 in the extended position once the box reaches that position. The locks 40 may each include a pair of circular cross-section shafts 42 and 44 that are hingedly coupled to the plates 26 and 28, respectively. The shafts 42 and 44 are also hingedly coupled to each other, forming a central hinged joint 46. One of the shafts, the lower shaft 44 of each of the locks 40 as illustrated in FIGS. 2 and 3, has a coil spring 48 and a sliding collar 50 around it. The coil spring 48 urges the collar 50 toward the hinged joint 46 between the shafts 42 and 44. The upper shaft 42 of each lock 40 has a fixed collar stop 52. As the box 22 expands the shafts 42 and 44 of each lock 40 straighten out, eventually becoming aligned as shown in FIG. 3. Simultaneously the coil springs 48 around the bottom shafts urge the sliding collars 50 toward the joints 46 where the shafts 42 and 44 of each lock 40 are hinged together. The movement of the collars 50 stops when the collars 50 reach the collar stops 52, as shown in FIG. 3. At that location the collars 50 cover the hinged joints 46 between the shafts 42 and 44 of each lock 40, locking the shafts 42 and 44 in their aligned configuration.

Figure 4:
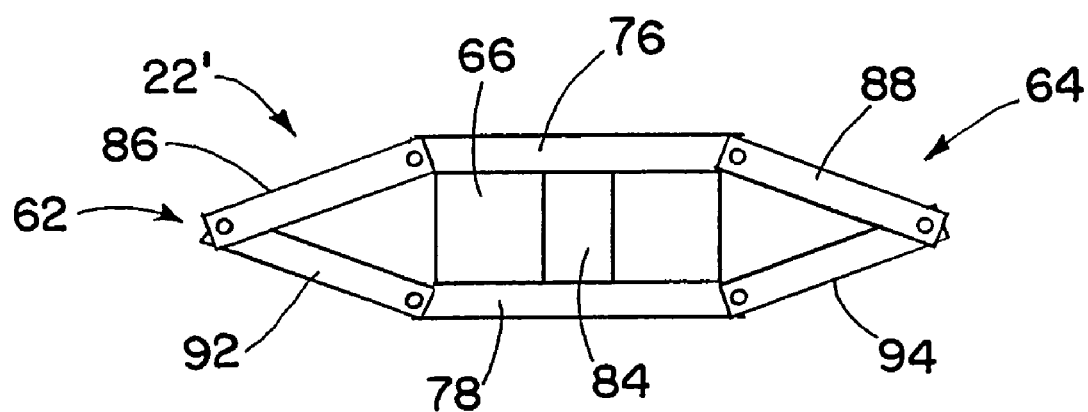
FIG. 4 is a side view of another embodiment of an expandable beam, in a collapsed or low-height configuration, usable in the wing of FIG. 1.
Figure 5:
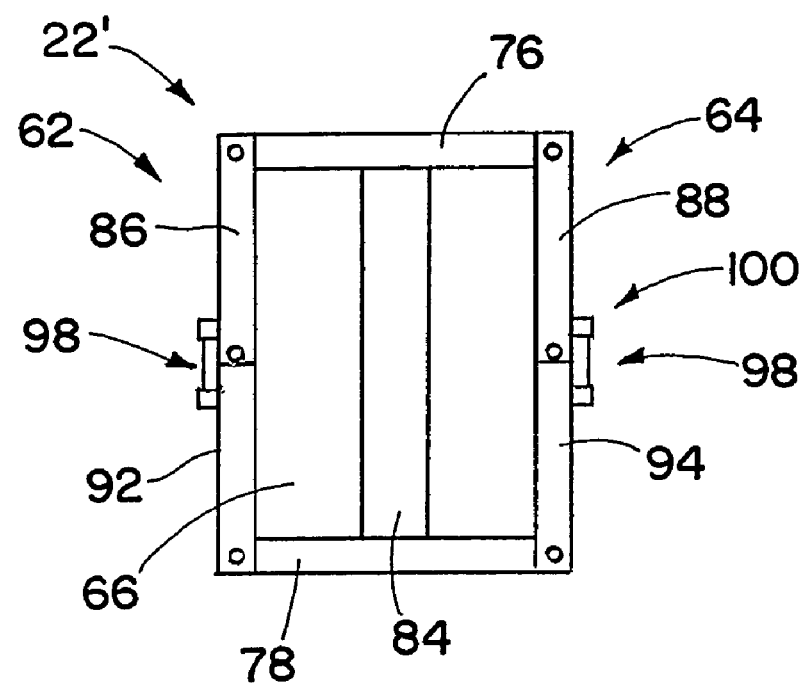
FIG. 5 is a side view of the expandable beam of FIG. 4, in an expanded or high-height configuration.

FIGS. 4 and 5 show a different box configuration 22', with hinged sheet metal sides 62 and 64 substituting for the hinged shafts 42 and 44 of the configuration of FIGS. 2 and 3. The SMF material 66 between the top and bottom plates 76 and 78 is maintained in the collapsed condition (FIG. 4) by the SMF material 66 or other material between the plates. When the SMF material 66 is activated to transform the material to the expanded or extended condition (FIG. 5), the SMF material 66 extends, aided by the action of coil springs 84 embedded in the SMF material 66.

The sheet metal sides 62 and 64 may extend substantially the full length of the box or beam 22'. The sheet metal sides 62 and 64 are each divided into upper parts 86 and 88, and lower parts 92 and 94. The upper and lower parts are hingedly coupled to one another, and the sides are hingedly coupled to the top and bottom plates 76 and 78. The sides 62 and 64 straighten as the plates 76 and 78 are moved apart in going from the collapsed or compact configuration (FIG. 4) to the expanded or extended configuration (FIG. 5). The extension of the box 22' is similar to that of a scissors jack, with the SMF material 66 and the embedded coil springs 84 providing the extension force.

As shown in FIG. 5, a pair of spring-loaded latch pins 98 are used as a lock mechanism 100 to lock the sides in place when in the extended or expanded configuration, to maintain the extended configuration once it is achieved. The latch pins 98 prevent the parts 86-94 of the sides 62 and 64 from pivoting relative to each other.

Parts of the various embodiments may be made using a variety of suitable materials, such as steel, aluminum, titanium, and alloys.

It will be appreciated that a wide variety of suitable additives may be used to make a polymer a shape memory polymer. The glass transition temperature and other characteristics of the shape memory polymer material may be controlled by the type and amount of additives. Other characteristics for the shape memory polymer material may be suitability for the chemical or other environment that the material is exposed to. The shape memory polymer material, either solid or foam, may be either a polyurethane-based material or an epoxy-based material. Cyanate-ester-based materials may also be utilized. It will be appreciated that a wide variety of other polymers may be utilized. Foam materials have the advantage of having much greater strain capacities than neat resin materials. However, it will be appreciated that foam materials have less stiffness than solid materials. The Poisson's ratio of the neat resin may be around 0.4 to 0.5. This will result in significant lateral expansion and contraction of the foam material 12 with change of wingspan, unless some force is applied to hold the shape memory polymer material at the desired outer mold line. The Poisson's ratio of the shape memory polymer foam may be less than 0.1.

It will be appreciated that the invention is not limited to the specific embodiments described above. More broadly, the collapsible beam or box may have any of a variety of configurations for selectively expanding thickness of all or part of a wing. Shape memory foam material or other expandable material may be located between top and bottom surface of the beam. Shape memory foam material may be used to releasably secure the box in a compact configuration. The shape memory foam material (or other expandable material) may also provide part of the motive force for separating parts of the beam or box. Alternatively or in addition, the force for expanding the collapsible beam may include one or more resilient devices such as one or more springs. The resilient devices may be coil springs placed between parts of the collapsible beam, such as embedded in the foam material between plates or other structures at the top or bottom of collapsible (expandable) beam.

The various embodiments of the wing 10 may be parts of a deployable aircraft or other air vehicle, such as a UAV. Various control surfaces of the UAV may deployed by various methods, for example as described in U.S. Pat. No. 7,338,010, the description and figures of which are incorporated herein by reference. The beam or box 22 (FIG. 1A) may be used to increase the thickness of the wing 10 during or after deployment of the wing 10. The wing 10 may be stored with the shape SMF material 14 and the SMP skin 12 configured so as to naturally assume a shape for the box 22 and the wing 10 that the wing 10 assumes when the box or beam 22 is in its expanded configuration. This allows the wing 10 to easily assume the deployed configuration, with the box or beam 22 expanded, without the foam 14 or the skin 12 resisting shape change due to setting (assuming its stored shape during storage of the UAV prior to deployment).

It will be appreciated that the expandable (collapsible) box or beam 22 may be used in other sorts of structures. The box or beam 22 may be incorporated in any sort of structure in which thickness or some other dimension is to be selectively increased.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An air vehicle wing comprising:
   a wing skin; and
   a collapsible beam enclosed by the wing skin, wherein the collapsible beam can be selectively expanded or collapsed to change thickness of the wing,
   wherein the collapsible beam includes:
   a pair of plates; and
   a polymer foam between the plates.

2. The wing of claim 1, wherein the beam is expanded by moving the plates away from each other, and the beam is collapsed by moving the plates toward each other.

3. The wing of claim 1, wherein the plates are substantially parallel to each other.

4. The wing of claim 1, further comprising one or more coil springs between the plates.

5. The wing of claim 1, wherein the polymer foam is a shape memory polymer foam.

6. The wing of claim 1, further comprising a lock mechanism to maintain the plates in an expanded configuration.

7. The wing of claim 6, wherein the lock mechanism includes collars on hinged shafts of the beam.

8. The wing of claim 6, wherein the lock mechanism includes hinge pins.

9. The wing of claim 8, wherein the hinge pins lock hinged side sheet metal sides of the beam.

10. The wing of claim 1, wherein the wing skin includes a solid polymer material.

11. The wing of claim 1, further comprising a shape memory polymer foam between the wing skin and the collapsible beam.

12. The wing of claim 1, further comprising a reinforcing plate enclosed by the wing skin and oriented along a chord of the wing.

13. A method of increasing thickness of a wing, the method comprising:
   expanding a collapsible beam within the wing; and
   locking the collapsible beam in place in an expanded configuration, wherein the locking includes locking using a lock mechanism of the beam,
   wherein the expanding includes moving apart a pair of plates of the collapsible beam, and
   wherein the expanding includes expanding a polymer foam that is located between the plates of the collapsible beam.

14. The method of claim 13, wherein the moving apart includes using coil springs between the plates to move the plates apart.

15. The method of claim 13, wherein the locking includes locking hinged shafts of the collapsible beam.

16. The method of claim 13, wherein the locking includes locking hinged sheet metal sides of the collapsible beam.

17. An airfoil comprising:
   a solid polymer material skin; and
   a collapsible beam enclosed by the skin, wherein the collapsible beam can be selective expanded or collapsed to change thickness of the structure;
   wherein the collapsible beam includes:
   a pair of plates that are substantially parallel to each other;
   a foam between the plates; and
   one or more coil springs between the plates;
   wherein the beam is expanded by moving the plates away from each other, and the beam is collapsed by moving the plates toward each other.

* * * * *